US010466974B2

(12) United States Patent
Young et al.

(10) Patent No.: US 10,466,974 B2
(45) Date of Patent: Nov. 5, 2019

(54) INDEPENDENT EXPRESSION ANIMATIONS (71) Applicant: Microsoft Technology Licensing, LLC, Redmond, WA (US)

(72) Inventors: Anthony Young, Bellevue, WA (US); Luciano Baretta Mandryk, Seattle, WA (US); Lucas Haines, Renton, WA (US); Mark Aldham, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 212 days.

(21) Appl. No.: 14/686,748

(22) Filed: Apr. 14, 2015

(65) Prior Publication Data

US 2016/0306611 A1 Oct. 20, 2016

(51) Int. Cl.
*G06F 8/30* (2018.01)
*G06F 9/54* (2006.01)
*G06F 8/38* (2018.01)
*G06F 9/451* (2018.01)

(52) U.S. Cl.
CPC .............. *G06F 8/315* (2013.01); *G06F 8/38* (2013.01); *G06F 9/451* (2018.02); *G06F 9/54* (2013.01)

(58) Field of Classification Search
CPC ... G06F 8/315; G06F 9/54; G06F 8/38; G06F 9/451
USPC ........................................................ 717/108
See application file for complete search history.

(56) References Cited

U.S. PATENT DOCUMENTS

| 5,261,041 A | 11/1993 | Susman |
| 6,310,621 B1 | 10/2001 | Gagne et al. |
| 6,329,994 B1 | 12/2001 | Gever et al. |
| 6,353,437 B1 | 3/2002 | Gagne |
| 7,932,909 B2 | 4/2011 | Niles et al. |

(Continued)

FOREIGN PATENT DOCUMENTS

| EP | 947912 A2 | 10/1999 |
| EP | 2584462 A1 | 4/2013 |
| WO | 2014204502 A1 | 12/2014 |

OTHER PUBLICATIONS

"Expression Controller Techniques", Available at: <<http://www.3dmax-tutorials.com/Expression_Controller_Techniques.html>>, Retrieved on: Mar. 16, 2015, 2 pages.

(Continued)

*Primary Examiner* — Emerson C Puente
*Assistant Examiner* — Sen Thong Chen
(74) *Attorney, Agent, or Firm* — Arent Fox, LLP (57) ABSTRACT

In one embodiment, a user interface system may execute an independent expression in a secondary code set to facilitate taking a dynamic object reading for a target composition object. The user interface system may execute a primary code thread and a secondary code thread for a user interface. The primary code thread may generate an independent expression resident in the secondary code thread. The independent expression may gather an input set resident in the secondary code thread for a target composition object. The secondary code thread may render the target composition object based on the input set.

20 Claims, 12 Drawing Sheets

(56) References Cited

U.S. PATENT DOCUMENTS

| | | | |
|---|---|---|---|
| 8,776,091 B2 | 7/2014 | Mandryk | |
| 2004/0189669 A1 | 9/2004 | David et al. | |
| 2006/0020914 A1* | 1/2006 | Arthurs | G06F 9/449 717/106 |
| 2006/0274070 A1 | 12/2006 | Herman et al. | |
| 2008/0195647 A1* | 8/2008 | Russ | G06F 9/44521 |
| 2009/0259951 A1 | 10/2009 | Whitechapel et al. | |
| 2010/0149094 A1* | 6/2010 | Barnes | G01W 1/02 345/156 |
| 2010/0262902 A1* | 10/2010 | Burns | G06F 8/38 715/234 |
| 2011/0271281 A1 | 11/2011 | Mandryk | |
| 2012/0210262 A1 | 8/2012 | Sheeler et al. | |
| 2013/0055072 A1* | 2/2013 | Arnold | G06T 15/503 715/240 |
| 2013/0055296 A1* | 2/2013 | Tierney | G06F 9/54 719/331 |
| 2013/0159978 A1* | 6/2013 | Jazdzewski | G06F 11/3636 717/129 |
| 2013/0247012 A1* | 9/2013 | Gainey, Jr. | G06F 11/3644 717/130 |
| 2013/0266008 A1* | 10/2013 | Xue | H04L 12/4641 370/389 |
| 2013/0332859 A1 | 12/2013 | Patton et al. | |

OTHER PUBLICATIONS

LaViola, Joseph J., "Mathematical Sketching: An approach to making Dynamic Illustrations", "Sketch-based Interfaces and Modeling", 2011, pp. 81-118.

"Blender", Available at: <<http://wiki.blender.org/index.php/Doc:2.6/Manual>>, Oct. 26, 2011, 3 pages.

Bhatti, Zeeshan, et al., "Expression driven Trignometric based Procedural Animation of Quadrupeds", In Proceedings of International Conference on Informatics and Creative Multimedia, Sep. 3, 2013, 7 pages.

"Maya", Available at: <<http://www.autodesk.in/products/maya/features/3d-animation/list-view#>>, Retrieved on Mar. 16, 2015, 3 pages.

"International Preliminary Report on Patentability Issued in PCT Application No. PCT/US2016/024686", dated Jul. 7, 2017, 7 Pages.

"Second Written Opinion Issued in PCT Application No. PCT/US2016/024686", dated Apr. 6, 2017, 6 Pages.

"International Search Report & Written Opinion Issued in PCT Application No. PCT/US2016/024686", dated Jun. 3, 2016, 12 Pages.

"Office Action Issued in European Patent Application No. 16715426.9", dated Apr. 15, 2019, 5 Pages.

* cited by examiner

INDEPENDENT EXPRESSION ANIMATIONS

BACKGROUND

A computing device may use multi-threaded processing to more efficiently present a user interface to the user. Multi-threaded processing executes multiple sequences of instructions nearly simultaneously, either in the same processor or across multiple processors in a processing core. The processing core may execute a primary process having a primary code set, such as an application code set, to execute the infrastructure of the user interface module. The primary code thread may offload tasks to a secondary process having a secondary code set, executed by the processing core as a secondary code thread. For example, a user interface application code thread may offload the presentation aspects of the user interface to a secondary code set, executed as a secondary code thread, for rendering. Thus the secondary code thread may be referred to as a rendering code thread. The secondary code thread may render a user interface object, such as an animation graphic or a bitmap image, referred to as a composition object.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to executing an independent expression in a secondary code set to facilitate taking a dynamic object reading for a target composition object. The user interface system may execute a primary code thread and a secondary code thread for a user interface. The primary code thread may generate an independent expression resident in the secondary code thread. The independent expression may gather an input set resident in the secondary code thread for a target composition object. The secondary code thread may render the target composition object based on the input set.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

The implementations may be a user interface system, a tangible machine-readable medium having a set of instructions detailing a method stored thereon for at least one processor, or a machine-implemented method.

Separate threads may prevent a developer from describing an object property relative to other object properties in an animation. Separate processes may be operating each thread, so that each thread is accessing different memory areas, preventing easy collaboration. By using an expression, an application code may execute an application programming interface call to describe the value of an object property in a user interface system as a function of other object properties by combining them with a rich set of operations and conditionals. The expression may be independent, in that the expression may gather a value for an object property in the resident thread or process without interacting with the other thread or process. The code thread may independently evaluate the independent expression at runtime, without direct involvement from the calling object on a per-frame basis, allowing real time updates to the expression value. Further, a secondary code thread may use an expression to interpolate intermediate values in an animated object by combining adjacent key frames of that animated object. For example, for a dynamic value "p" representing the progress between two key frames in a range from 0 to 1, the expression "p*p" may indicate that the key frame values may be combined according to a quadratic curve.

The independent expression may connect with a composition object via a binding. A binding is an associate between an expression and a source of values that may animate another property. The object property reference may represent both the object and the property in the expression as an object handle and a property handle pair to locate the corresponding object instance and access the corresponding property within that instance.

The independent expression may have a source binding or a target binding. A source binding may indicate an object property to be input into the expression. The expression may generate a source binding when a variable expression node is added. The source binding may have multiple sample modes. In a single sample mode, the source binding may read a property once and hold that value for the lifetime of the expression. In a continuous sample mode, the source binding may refresh a property value each time the expression is processed. In a looping sample mode, the source binding may refresh at the start of each animation iteration. By using the continuous sample mode or the looping sample mode, the independent expression may read from a dynamic object. A dynamic object has property values that change over time. For example, the user interface system may animate a first object to move towards a second object. As the second object moves, the expression may adjust the trajectory of the first object based on the change to the position of the second object.

A target binding may indicate an object property to output to a target composition object. The expression may generate a target binding when a target is added to an expression. The target binding may indicate the location to write the output of an expression. A binding may be associated with a specific channel of a property, allowing individual channels to be animated by different, independent sources. If a target composition object is currently bound to an independent expression and the primary code thread or the secondary code thread attempts to bind the target composition object to another expression or attempts to directly change the target value, the independent expression may resolve the conflict in a number of ways. In a first binding emphasis approach, an attempt to create a subsequent binding or directly set the property value may be invalidated until the current target binding is detached. In a last binding emphasis approach, an attempt to create a subsequent binding automatically detaches the current target binding, while an attempt to directly set the property value may be invalidated until the target binding is detached. In a last change emphasis approach, an attempt to create a subsequent binding or direct set the property value may automatically overwrite the current target binding.

The object property reference may be a "weak reference", allowing the referenced object to be disposed while the binding is active. If an object associated with a source binding is disposed while the binding is active, the independent expression may use a last known value. If the expression does not have a known value, the independent expression may use an appropriate "zero" value for the type. If an object associated with a target binding is disposed while the binding is active, the independent expression may remove the binding, potentially causing the independent expression to go inactive if no other targets are available.

Thus, in one embodiment, a user interface system may execute an independent expression in a secondary code set to facilitate taking a dynamic object reading for a target composition object. The user interface system may execute a primary code thread and a secondary code thread for a user interface. The primary code thread may generate an independent expression resident in the secondary code thread. The independent expression may gather an input set resident in the secondary code thread for a target composition object. The secondary code thread may render the target composition object based on the input set.

Figure 1:
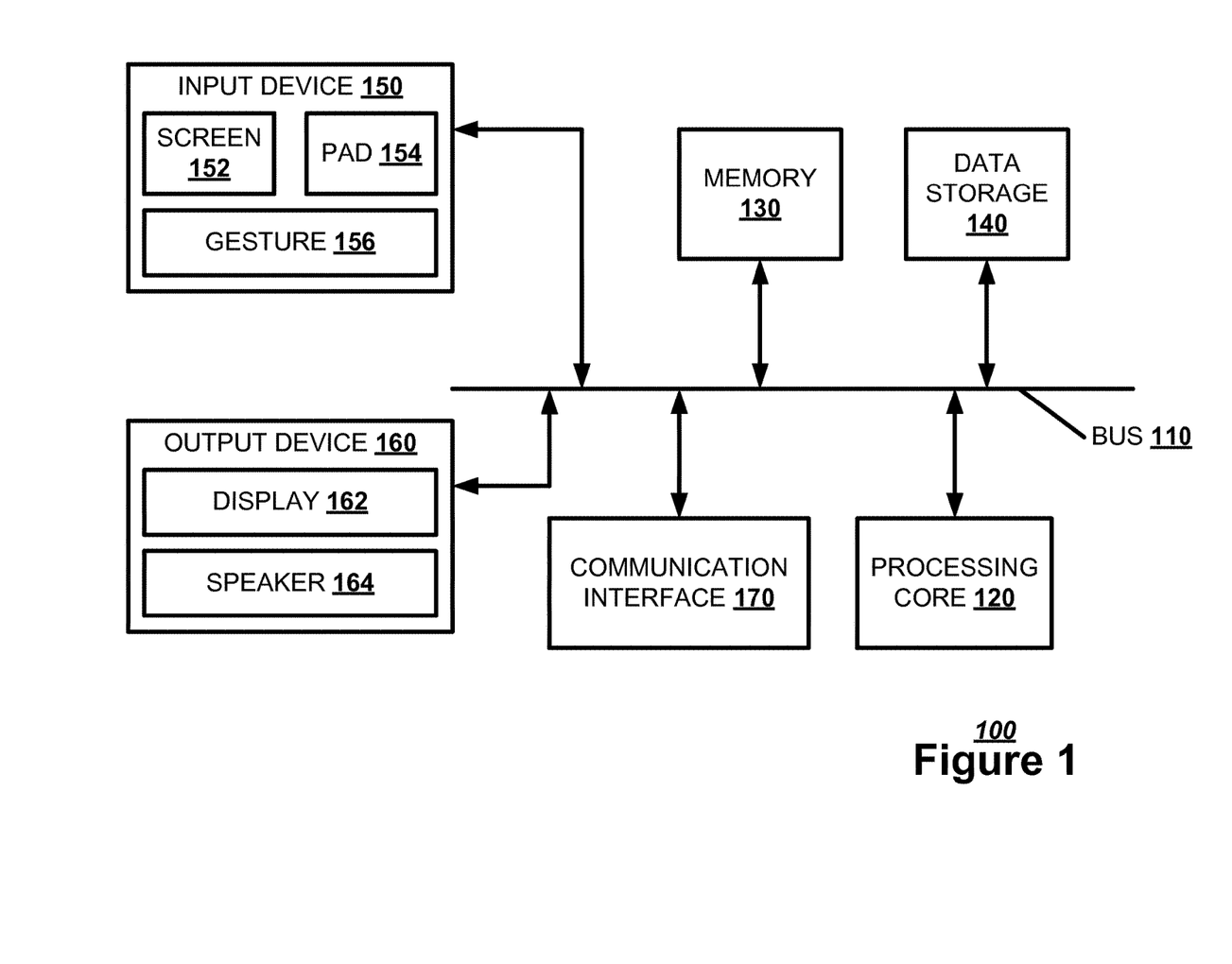
FIG. 1 illustrates, in a block diagram, one embodiment of a computing device.

FIG. 1 illustrates a block diagram of an exemplary computing device 100 which may act as a user interface system. The computing device 100 may combine one or more of hardware, software, firmware, and system-on-a-chip technology to implement the user interface system. The computing device 100 may include a bus 110, a processing core 120, a memory 130, a data storage 140, an input device 150, an output device 160, and a communication interface 170. The bus 110, or other component interconnection, may permit communication among the components of the computing device 100.

The processing core 120 may include at least one conventional processor or microprocessor that interprets and executes a set of instructions. The at least one processor may be configured to execute a primary code thread, such as an application code thread, to generate an independent expression resident in the secondary code thread. The at least one processor may be configured to execute a secondary code thread, such as a rendering code thread, to gather with the independent expression an input set resident in the secondary code thread for a target composition set and to render the target composition object based on the input set. The input set may have at least one of a source composition object reading of a source composition object or an ancillary object reading of an ancillary object. Alternately, the input set may have a dynamic object reading. The secondary code thread may execute a predecessor independent expression before the independent expression.

The primary code thread may generate a source composition object in the secondary code thread. The primary code thread may execute a source binding call for a source binding between a source composition object in the secondary thread and the independent expression. The source composition object may establish the source binding with the independent expression. Alternately, the independent expression may establish the source binding with the source composition object. The independent expression may determine a sampling mode for the source binding. The independent expression may substitute a replacement value for a source composition object reading when a source composition object has been disposed during an active source binding.

The primary code thread may generate a target composition object in the secondary code thread. The primary code thread may execute a target binding call for a target binding between the target composition object and the independent expression. The target composition object may establish the target binding with the independent expression. Alternately, the independent expression may execute the target binding call to establish the target binding with the source composition object. The target composition object may detach a target binding with the independent expression upon at least one of a successor target binding call and a target value change.

The memory 130 may be a random access memory (RAM) or another type of dynamic data storage that stores information and instructions for execution by the processing core 120. The memory 130 may also store temporary variables or other intermediate information used during execution of instructions by the processing core 120. The memory 130 may be configured to store a user interface operated by a primary code thread, such as an application code, and a secondary code thread, such as a rendering code thread.

The data storage 140 may include a conventional ROM device or another type of static data storage that stores static information and instructions for the processing core 120. The data storage 140 may include any type of tangible machine-readable medium, such as, for example, magnetic or optical recording media, such as a digital video disk, and its corresponding drive, or a solid state drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 140 may store a set of instructions detailing a method that when executed by one or more processors cause the one or more processors to perform the method. The data storage 140 may also be a database or a database interface for storing a user interface code set having a primary code set and a secondary code set.

The input device 150 may include one or more conventional mechanisms that permit a user to input information to the computing device 100, such as a keyboard, a mouse, a voice recognition device, a microphone, a headset, a touch screen 152, a touch pad 154, a gesture recognition device 156, etc. The output device 160 may include one or more conventional mechanisms that output information to the user, including a display screen 162, a printer, one or more speakers 164, a headset, a vibrator, or a medium, such as a memory, or a magnetic or optical disk and a corresponding disk drive. The communication interface 170 may include any transceiver-like mechanism that enables computing device 100 to communicate with other devices or networks. The communication interface 170 may include a network interface or a transceiver interface. The communication interface 170 may be a wireless, wired, or optical interface.

The computing device 100 may perform such functions in response to processing core 120 executing sequences of instructions contained in a computer-readable medium, such as, for example, the memory 130, a magnetic disk, or an optical disk. Such instructions may be read into the memory 130 from another computer-readable medium, such as the data storage 140, or from a separate device via the communication interface 160.

Figure 2:
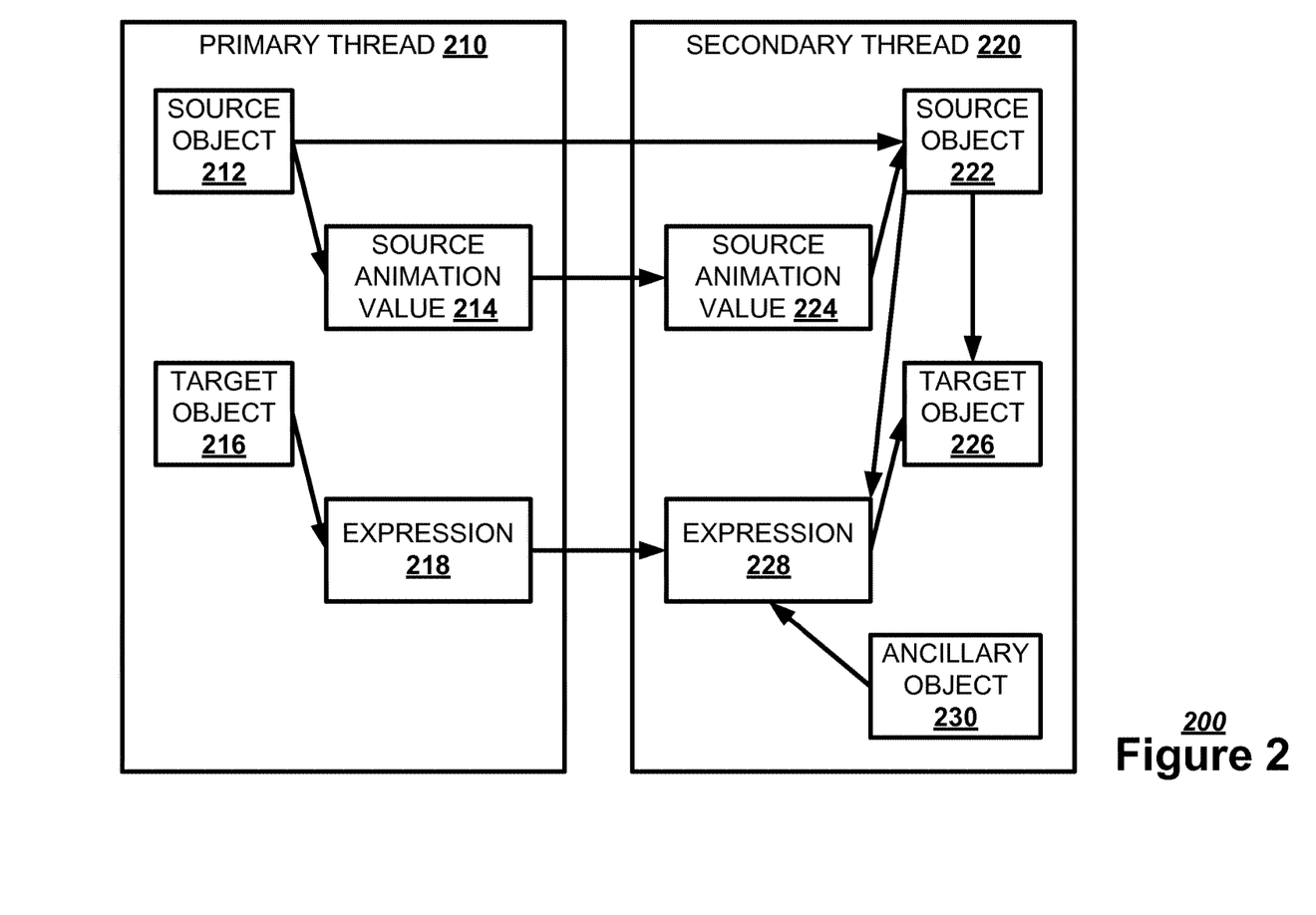
FIG. 2 illustrates, in a block diagram, one embodiment of a multi-threaded architecture.

FIG. 2 illustrates, in a block diagram, one embodiment of a multi-threaded architecture 200. The user interface may have a primary process, such as an application process, executing a primary code thread 210, such as an application code thread, and a secondary process, such as a rendering process, executing a secondary code thread 220, such as a rendering code thread. The primary code thread 210 may process a primary source composition object 212 to generate a secondary source composition object 222 in the secondary thread 220. The composition object may be a dynamic object that changes over time. The primary source composition object 212 may drive a primary source animation value 214 that causes a secondary source animation value 224 to change in the secondary thread 220. Changes to the secondary source animation value 224 cause a characteristic of the secondary source composition object 222 to change in response.

The primary code thread 210 may process a primary target composition object 216 to generate a secondary target composition object 226 in the secondary thread 220. The secondary target composition object 226 may change in response to changes of the secondary source composition object 222. The target composition object may be a target user interface animation. Previously, the secondary source composition object 226 would report the characteristic change back to the primary source composition object 212. The primary source composition object 212 would then update the primary target composition object 216, which would then update the secondary target composition object 226.

Instead, the primary code thread 210 may process a primary expression 218 associated with the primary target composition object 216 to generate a secondary expression 228 in the secondary code thread 220. The secondary expression 228 may gather data readings for an input set that causes changes to a characteristic of the secondary target composition object 226. The secondary expression 228 may be independent, in that the secondary expression 228 may receive data resident in the secondary code thread 220, without interaction with the primary code thread 210. For example, the secondary expression 228 may receive a source composition object reading from the secondary source composition object 222. The secondary expression 228 may gather data readings from multiple sources. The secondary expression 228 may receive an ancillary object reading of an ancillary object 230. An ancillary object 230 is an object separate from the user interface code, such as an internal compass or clock. The secondary expression 228 may collate readings from multiple sources for input into the secondary target composition object 226.

Figure 3:
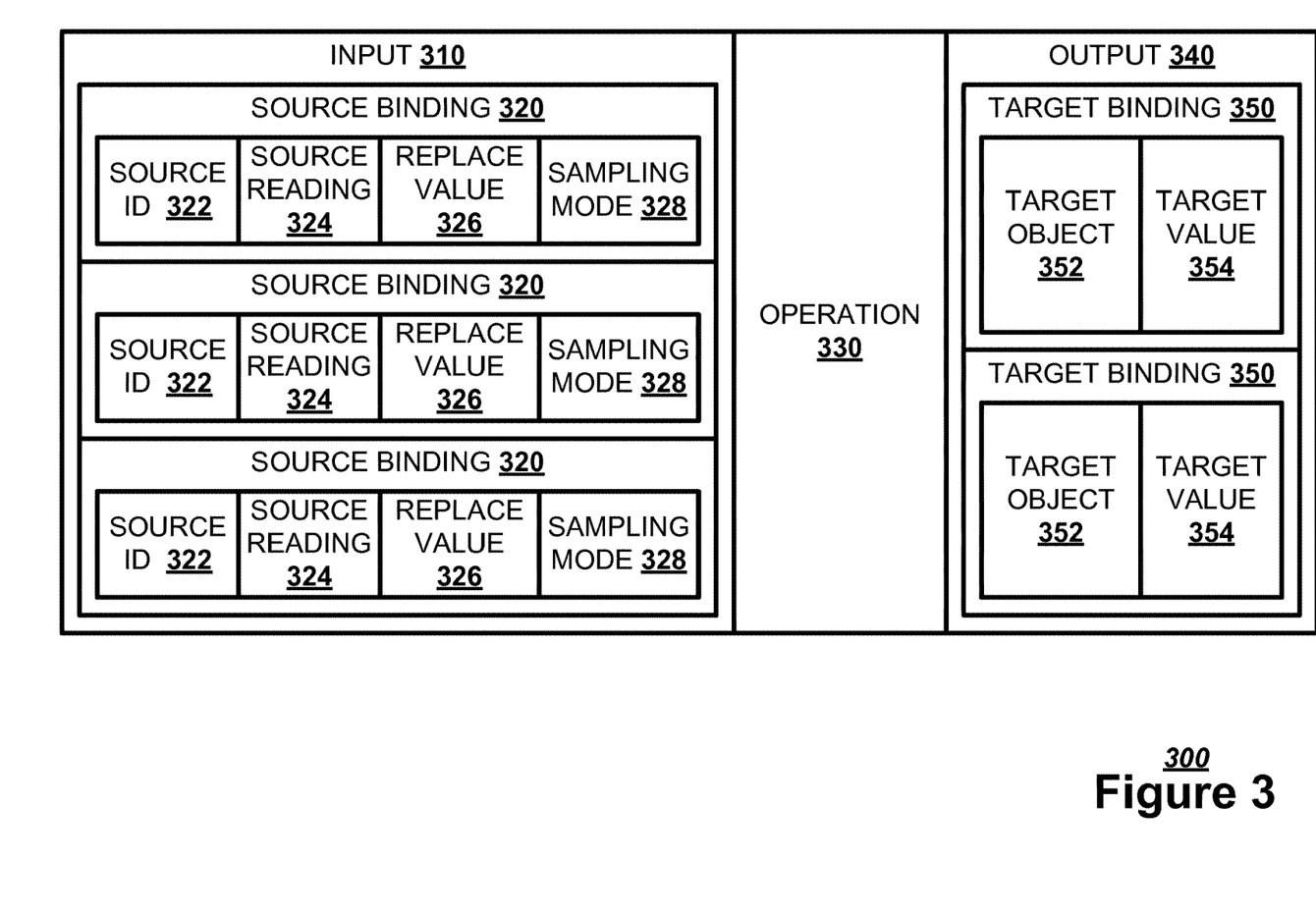
FIG. 3 illustrates, in a block diagram, one embodiment of an expression architecture.

FIG. 3 illustrates, in a block diagram, one embodiment of an expression architecture 300. The expression may gather one or more inputs 310 for processing. The expression may have one or more source bindings 320 connecting the expression to a variety of input 310 sources. A source may be a source composition object or an ancillary object. The source binding 320 may have a source identifier 322 identifying a source connected to the expression. A source composition object or the independent expression may initiate establishment of a source binding 320 upon execution of a source binding call. A source binding call is an application programming interface call that inserts a variable representing a reading of the source composition object into the independent expression. The source binding 320 may take a source reading 324 from the source composition object. The source binding 320 may store a replacement value 326 representing a substitute reading if the source has been disposed during an active source binding 320. A source binding 320 is active during use by the expression. The replacement value 326 may be a last known value or a pre-defined default value. The source binding may have a sampling mode 328 indicating the frequency that the source binding 320 takes readings from the source.

The expression may have one or more operations 330 that the expression executes on the source readings 324 to create a value for output 340. In addition to compiling the inputs 310, the operation may perform other mathematical operations, such as offsets and multiplication factors. The output 340 may have one or more target bindings 350 connecting the expression to a variety of output 340 targets, such as a target composition object. A target composition object or an independent expression may initiate establishment of a target binding 350 upon execution of a target binding call. A target binding call is an application programming interface call that identifies a target composition object that receives a value from the independent expression. The target binding 350 may have a target identifier 352 identifying a target connected to the expression. The target binding 350 may provide a target value 354 computed by the expression as a result of combining the source readings 324 with the operations 330 to a target composition object, such as a target user interface animation.

Figure 4:
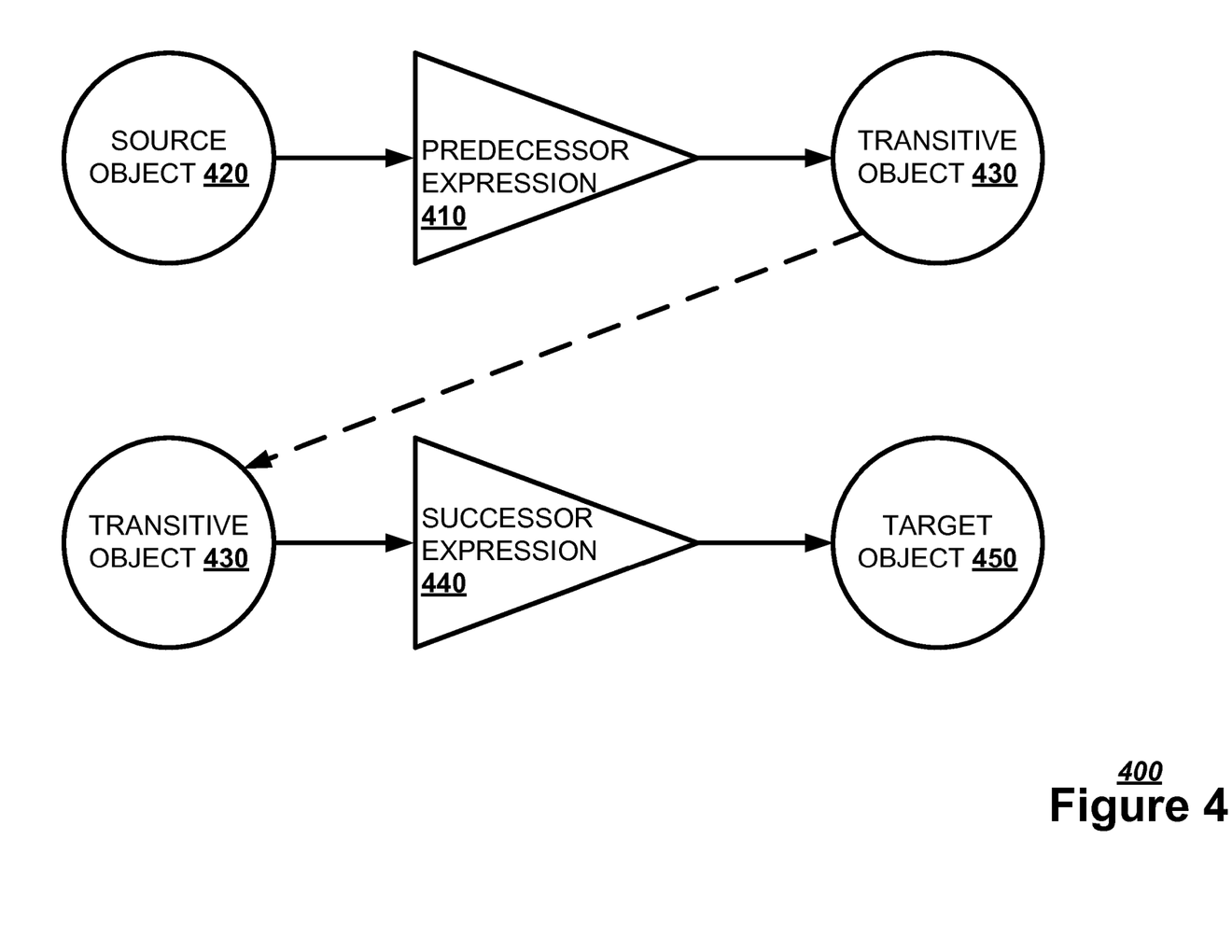
FIG. 4 illustrates, in a block diagram, one embodiment of an expression chain.

The target of one expression may be the source of a second expression, creating an expression chain. FIG. 4 illustrates, in a block diagram, one embodiment of an expression chain 400. A predecessor independent expression 410 may gather a source composition object reading from a source composition object 420. The predecessor independent expression 410 may output the expression reading to a transitive composition object 430. A successor independent expression 440 may gather a transitive composition object reading from the transitive composition object 430. The successor independent expression 440 may output the expression reading to a target composition object 450. Thus, the transitive composition object 430 may be a target composition object 450 for the predecessor independent expression 410 and a source composition object 420 for the successor independent expression 440. As the successor independent expression 440 is dependent on the output of the predecessor independent expression 410, the successor independent expression 440 is calculated after the predecessor independent expression 410. An independent expression may alternate between being a successor independent expression 440 and a predecessor independent expression 410. By having the ultimate target composition object 450 of the successor independent expression 440 act as the ultimate source composition object 420 of the predecessor independent expression 410, the secondary code thread may create a recursive chain.

Figure 5:
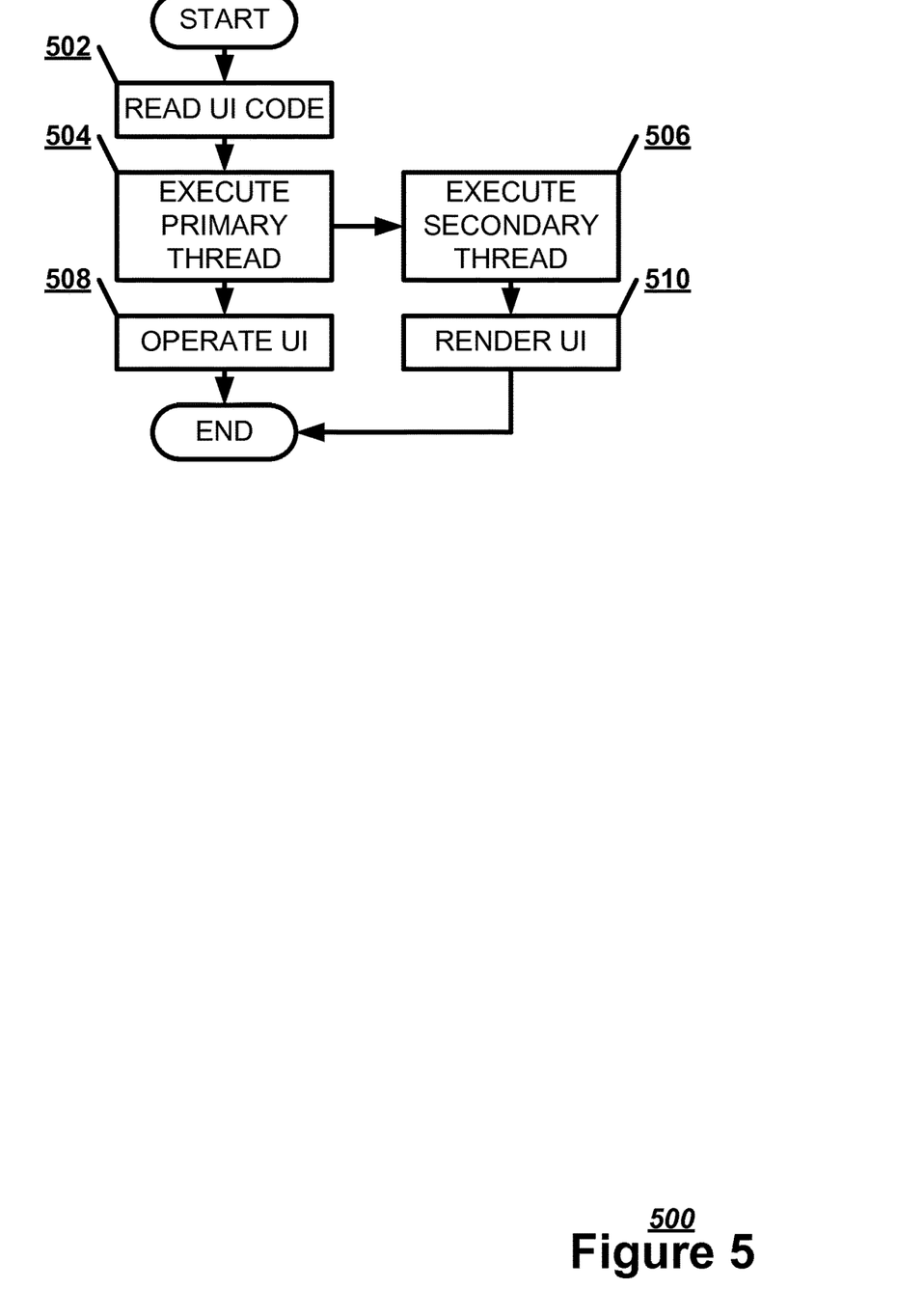
FIG. 5 illustrates, in a flowchart, one embodiment of a method of executing a multi-threaded user interface.

FIG. 5 illustrates, in a flowchart, one embodiment of a method 500 of executing a multi-threaded user interface. The user interface system may read a user interface code set from a memory (Block 502). The user interface system may execute a primary code thread for a user interface that initiates or connects with a secondary code thread (Block 504). Near simultaneously with the primary code thread, the user interface system may execute a secondary code thread for a user interface (Block 506). The user interface system may use the primary code thread to operate the infrastructure of the user interface (Block 508). The user interface system may use the secondary code thread to render the presentation of the user interface in accordance with the infrastructure (Block 510).

Figure 6:
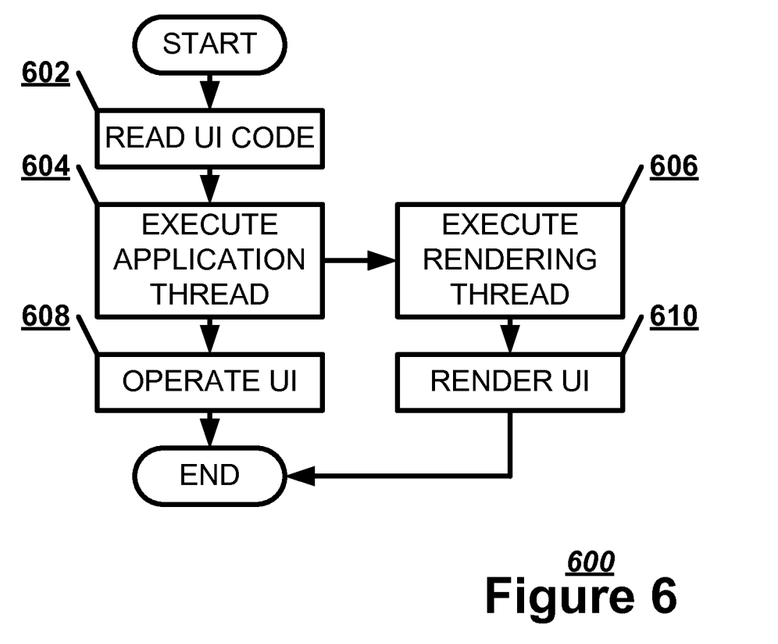
FIG. 6 illustrates, in a flowchart, one embodiment of a method of rendering a multi-threaded user interface.

The user interface system may use a more specialized code set. FIG. 6 illustrates, in a flowchart, one embodiment of a method 600 of rendering a multi-threaded user interface. The user interface system may read a user interface code set from a memory (Block 602). The user interface system may execute an application code thread for a user interface that initiates or connects with a rendering code thread (Block 604). Near simultaneously with the application code thread, the user interface system may execute a rendering code thread for a user interface (Block 606). The user interface system may use the application code thread to operate the infrastructure of the user interface (Block 608). The user interface system may use the rendering code thread to render the presentation of the user interface in accordance with the infrastructure (Block 610).

Figure 7:
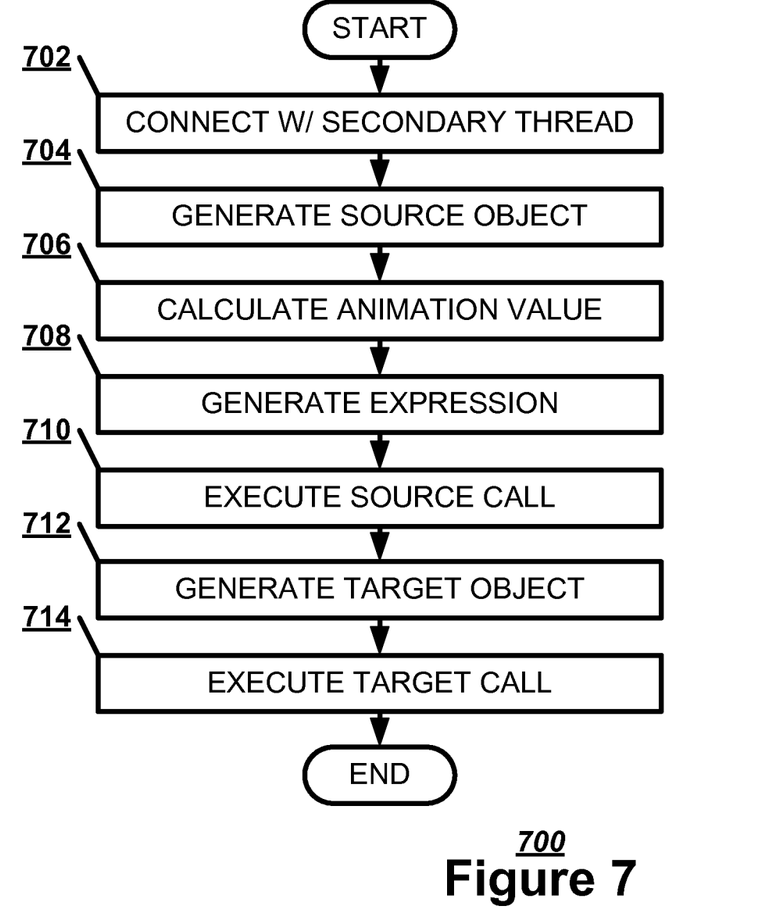
FIG. 7 illustrates, in a flowchart, one embodiment of a method of executing a primary code thread.

FIG. 7 illustrates, in a flowchart, one embodiment of a method 700 of executing a primary code thread, such as an application code thread. The primary code thread may connect with a secondary code thread (Block 702). The primary code thread may generate a source composition object, such as a dynamic object, resident in the secondary code thread (Block 704). The primary code thread may calculate an animation value in the secondary code thread to change a characteristic of the source composition object (Block 706). The primary code thread may generate an independent expression resident in the secondary code thread to gather an input set for a target composition object, such as a dynamic object reading (Block 708). The primary code thread may execute a source binding call for a source binding between the source composition object in the secondary thread and the independent expression (Block 710). The primary code thread may generate the target composition object in the secondary code thread (Block 712). The primary code thread may execute a target binding call for a target binding between the target composition object and the independent expression (Block 714).

Figure 8:
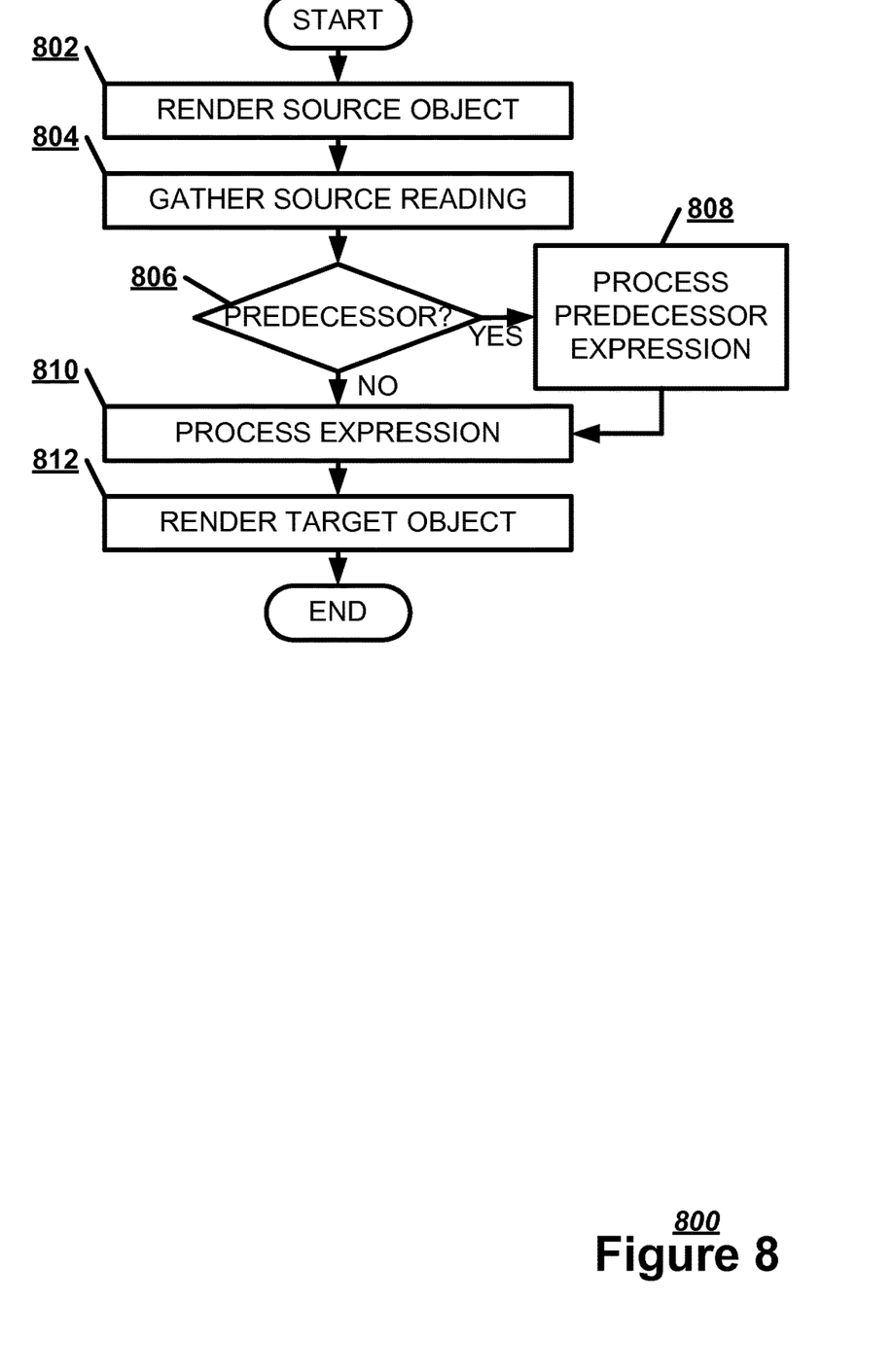
FIG. 8 illustrates, in a flowchart, one embodiment of a method of executing a secondary code thread.

FIG. 8 illustrates, in a flowchart, one embodiment of a method 800 of executing a secondary code thread, such as a rendering code thread. The secondary code thread may render a source composition object based on the animation value (Block 802). The secondary code thread may gather a source composition object reading from the source composition object (Block 804). If a predecessor independent expression feeds into the independent expression feeding into a target composition object (Block 806), the secondary code thread may process a predecessor independent expression before the independent expression (Block 808). The secondary code thread may process the independent expression to generate a target value by gathering an input set for the target composition object (Block 810). The secondary code thread may render the target composition object based on the input set (Block 812).

Figure 9:
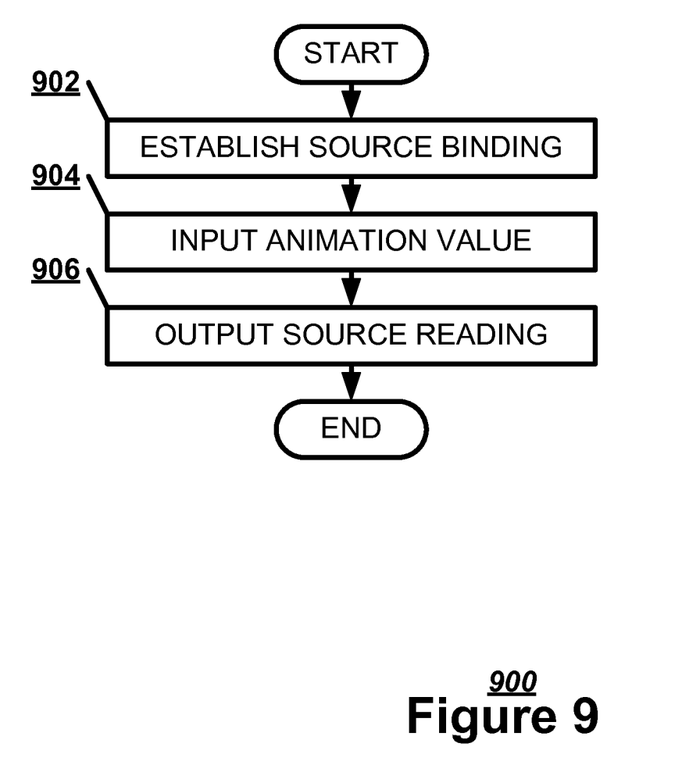
FIG. 9 illustrates, in a flowchart, one embodiment of a method of processing a source composition object.

FIG. 9 illustrates, in a flowchart, one embodiment of a method 900 of processing a source composition object. The source composition object may establish a source binding with the independent expression (Block 902). The source composition object may input an animation value to change a characteristic of the source composition object (Block 904). The source composition object may output a source composition object reading based on the animation value (Block 906).

Figure 10:
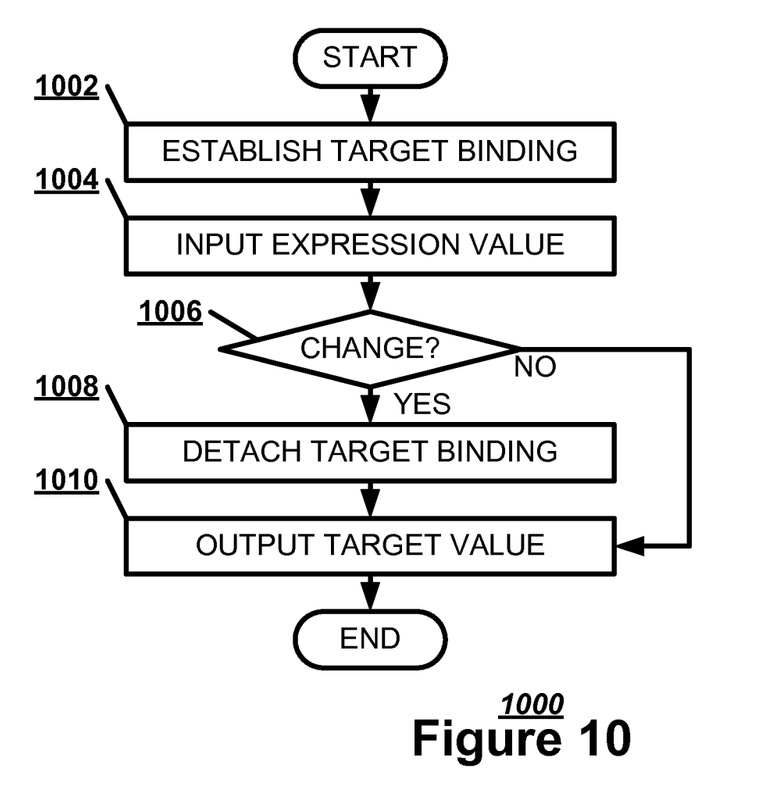
FIG. 10 illustrates, in a flowchart, one embodiment of a method of processing a target composition object.

FIG. 10 illustrates, in a flowchart, one embodiment of a method 1000 of processing a target composition object. The target composition object may establish a target binding with the independent expression (Block 1002). The target composition object may input an expression value to change a characteristic of the target composition object (Block 1004). If the target composition object executes a successor target binding call or the secondary code thread executes a target value change on the target composition object (Block 1006), the target composition object may detach the target binding with the independent expression upon at least one of a successor target binding call and a target value change (Block 1008). The target composition object may output a target value based on the expression value (Block 1010).

Figure 11:
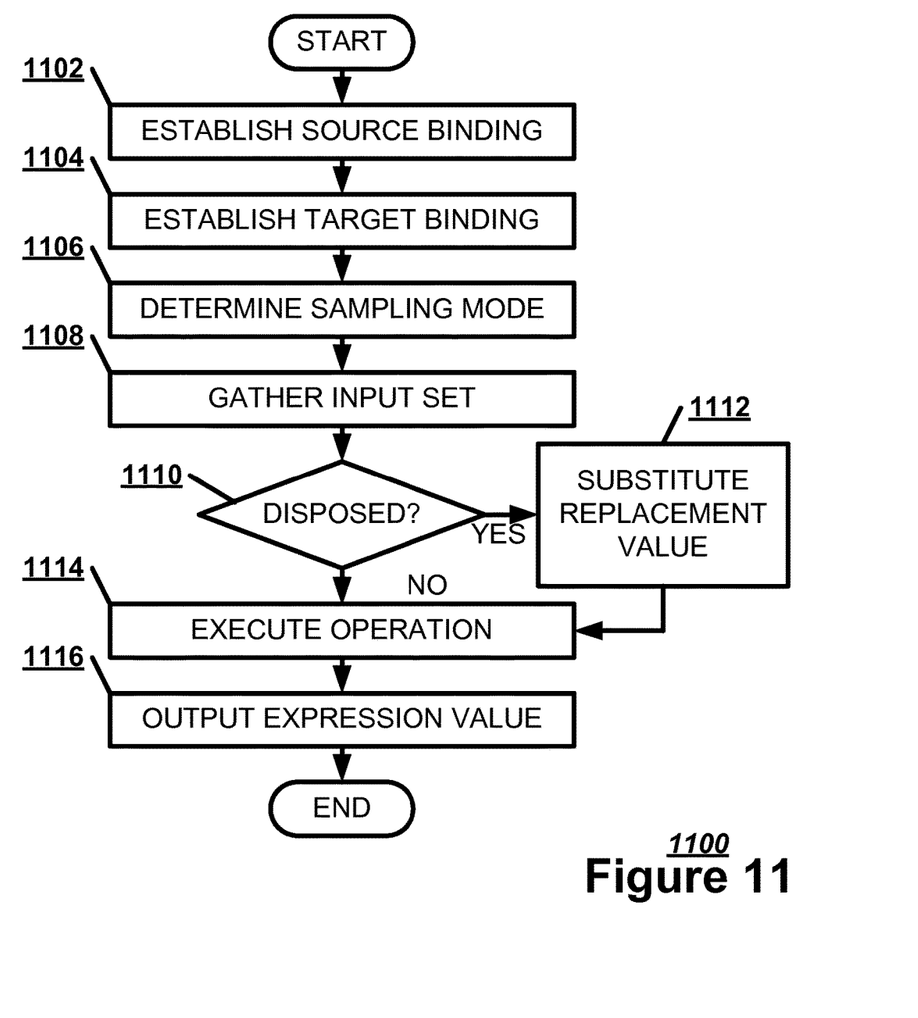
FIG. 11 illustrates, in a flowchart, one embodiment of a method of processing an independent expression.

FIG. 11 illustrates, in a flowchart, one embodiment of a method 1100 of processing an independent expression. The independent expression may establish a source binding with the source composition object (Block 1102). The independent expression may establish a target binding with the target composition object (Block 1104). The independent expression may determine a sampling mode for the source binding (Block 1106). The independent expression may gather an input set resident in a secondary code thread, such as a rendering code thread, for a target composition object at a frequency set by the sampling mode (Block 1108). If the secondary thread code has disposed of the source composition object during an active source binding (Block 1110), the independent expression may substitute a replacement value for a source composition object reading (Block 1112). The independent expression may execute an operation on the input set (Block 1114). The independent expression may output an expression value (Block 1116).

Figure 12:
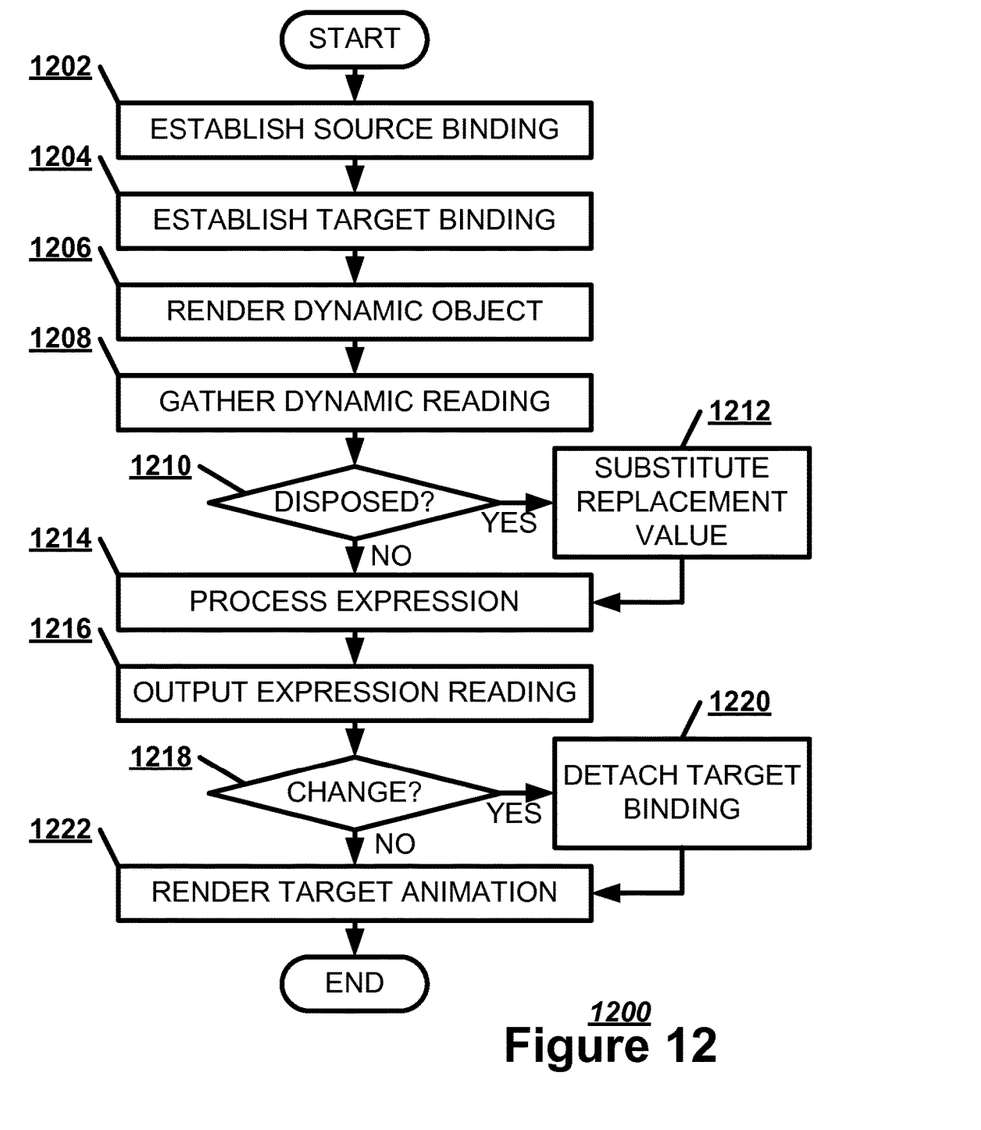
FIG. 12 illustrates, in a flowchart, one embodiment of a method of executing a secondary thread to render a target animation having a dynamic input.

FIG. 12 illustrates, in a flowchart, one embodiment of a method 1200 of executing a secondary code thread to render a target user interface animation having a dynamic input. The secondary code thread may establish a source binding between an independent expression and a dynamic object (Block 1202). The secondary code thread may establish a target binding between the independent expression and a target user interface animation (Block 1204). The secondary code thread may render the dynamic object (Block 1206). The secondary code thread may gather a dynamic object reading of the dynamic object for a target user interface animation using an independent expression (Block 1208). If the secondary thread code has disposed of the dynamic object during an active source binding (Block 1210), the independent expression may substitute a replacement value for the dynamic object reading (Block 1212). The secondary code thread may process an independent expression to generate an expression value by gathering an input set for the target user interface animation (Block 1214). The secondary code thread may output an expression value (Block 1216). If the target user interface animation executes a successor target binding call or the secondary code thread executes a target value change on the target user interface animation (Block 1218), the secondary code thread may detach the target binding between the target user interface animation and the independent expression upon at least one of a successor target binding call and a target value change (Block 1220). The secondary code thread may render the target user interface animation based on the dynamic object reading (Block 1222).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to store desired program code means in the form of computer-executable instructions or data structures, as opposed to propagating media such as a signal or carrier wave. Computer-readable storage media explicitly does not refer to such propagating media. Combinations of the above should also be included within the scope of the computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A method of presenting a user interface (UI), comprising:
connecting a primary code thread with a secondary code thread, wherein the primary code thread operates an infrastructure of the UI and the secondary code thread renders a presentation of the UI based on the infrastructure;
generating a source composition object in the secondary code thread;
calculating an animation value in the secondary code thread to change a characteristic of the source composition object;
generating an independent expression in the secondary code thread to gather an input set for a target composition object, wherein the independent expression receives data in the secondary code thread independent of any interaction with the primary code thread, and wherein the input set is at least an ancillary object reading of an ancillary object, the ancillary object being an object separate from a UI code;
executing a source binding call for a source binding between the source composition object in the secondary code thread and the independent expression;
generating the target composition object in the secondary code thread; and
executing a target binding call for a target binding between the target composition object and the independent expression, wherein the target binding indicates an object property to output to the target composition object and is associated with a channel of the object property.

2. The method of claim 1, further comprising rendering the target composition object based on the input set.

3. The method of claim 1, wherein the source composition object corresponds to a dynamic object that changes over time.

4. The method of claim 1, wherein the target composition object corresponds to a target UI animation.

5. The method of claim 1, wherein the independent expression collates readings from multiple sources for input into the target composition object.

6. The method of claim 1, wherein the source binding is active during use of the independent expression.

7. The method of claim 1, wherein the source binding includes a sampling mode indicating a frequency that the source binding receives readings from the source composition object.

8. The method of claim 1, wherein the secondary expression substitutes a replacement value for a source composition object reading in response to the source composition object being disposed during an active source binding.

9. The method of claim 8, further comprising substituting a replacement value for a dynamic object reading in response to the dynamic object being disposed during the active source binding.

10. An apparatus for presenting a user interface (UI), comprising:
a memory; and
a processor in communication with the memory, wherein the processor is configured to:
connect a primary code thread with a secondary code thread, wherein the primary code thread operates an infrastructure of the UI and the secondary code thread renders a presentation of the UI based on the infrastructure;
generate a source composition object in the secondary code thread;
calculate an animation value in the secondary code thread to change a characteristic of the source composition object;
generate an independent expression in the secondary code thread to gather an input set for a target composition object, wherein the independent expression receives data in the secondary code thread independent of any interaction with the primary code thread, and wherein the input set is at least an ancillary object reading of an ancillary object, the ancillary object being an object separate from a UI code;
execute a source binding call for a source binding between the source composition object in the secondary code thread and the independent expression;
generate the target composition object in the secondary code thread; and
execute a target binding call for a target binding between the target composition object and the independent expression, wherein the target binding indicates an object property to output to the target composition object and is associated with a channel of the object property.

11. The apparatus of claim 10, wherein the processor is further configured to render the target composition object based on the input set.

12. The apparatus of claim 10, wherein the source composition object corresponds to a dynamic object that changes over time.

13. The apparatus of claim 10, wherein the target composition object corresponds to a target UI animation.

14. The apparatus of claim 10, wherein the independent expression collates readings from multiple sources for input into the target composition object.

15. The apparatus of claim 10, wherein the source binding is active during use of the independent expression.

16. The apparatus of claim 10, wherein the source binding includes a sampling mode indicating a frequency that the source binding receives readings from the source composition object.

17. The apparatus of claim 10, wherein the secondary expression substitutes a replacement value for a source composition object reading in response to the source composition object being disposed during an active source binding.

18. The apparatus of claim 17, wherein the processor is further configured to substitute a replacement value for a dynamic object reading in response to the dynamic object being disposed during the active source binding.

19. A non-transitory computer-readable medium storing computer-executable code for presenting a user interface (UI), comprising:
code for connecting a primary code thread with a secondary code thread, wherein the primary code thread operates an infrastructure of the UI and the secondary code thread renders a presentation of the UI based on the infrastructure;
code for generating a source composition object in the secondary code thread;
code for calculating an animation value in the secondary code thread to change a characteristic of the source composition object;
code for generating an independent expression in the secondary code thread to gather an input set for a target composition object, wherein the independent expression receives data in the secondary code thread independent of any interaction with the primary code thread, and wherein the input set is at least an ancillary object reading of an ancillary object, the ancillary object being an object separate from a UI code;
code for executing a source binding call for a source binding between the source composition object in the secondary code thread and the independent expression;
code for generating the target composition object in the secondary code thread; and
code for executing a target binding call for a target binding between the target composition object and the independent expression, wherein the target binding indicates an object property to output to the target composition object and is associated with a channel of the object property.

20. The non-transitory computer-readable medium of claim 19, further comprising code for rendering the target composition object based on the input set.

* * * * *